(12) United States Patent
Qi et al.

(10) Patent No.: US 11,327,502 B2
(45) Date of Patent: May 10, 2022

(54) SMART LAWN MOWER

(71) Applicant: LINGDONG TECHNOLOGY(BEIJING)CO.LTD, Beijing (CN)

(72) Inventors: Ou Qi, Beijing (CN); Chiung-Lin Chen, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 446 days.

(21) Appl. No.: 16/441,039

(22) Filed: Jun. 14, 2019

(65) Prior Publication Data

US 2019/0384316 A1 Dec. 19, 2019

(30) Foreign Application Priority Data

Jun. 19, 2018 (CN) .......................... 201810631379.4

(51) Int. Cl.
*G05D 1/02* (2020.01)
*G06T 7/90* (2017.01)
(Continued)

(52) U.S. Cl.
CPC ......... *G05D 1/0246* (2013.01); *A01D 34/008* (2013.01); *G05D 1/0088* (2013.01); *G05D 1/0219* (2013.01); *G05D 1/0221* (2013.01); *G06K 9/6227* (2013.01); *G06T 7/90* (2017.01); *G06V 20/56* (2022.01); *G06V 40/10* (2022.01); *H04N 5/2257* (2013.01); *A01D 2101/00* (2013.01); *G05D 2201/0208* (2013.01); *G06T 2207/30188* (2013.01); *G06T 2207/30252* (2013.01)

(58) Field of Classification Search
CPC .. G05D 1/0246; G05D 1/0088; G05D 1/0219; G05D 1/0221; G05D 2201/0208; A01D 34/008; A01D 2101/00; G06K 9/00362; G06K 9/00791; G06T 2207/30252
See application file for complete search history.

(56) References Cited

U.S. PATENT DOCUMENTS

2013/0190965 A1* 7/2013 Einecke ............. G06K 9/00664
701/28
2016/0366818 A1 12/2016 Ouyang
(Continued)

FOREIGN PATENT DOCUMENTS

CN 104239886 A * 12/2014
CN 105512689 A 4/2016
(Continued)

*Primary Examiner* — Michael J Zanelli
(74) *Attorney, Agent, or Firm* — NZ Carr Law Office PLLC

(57) ABSTRACT

A smart lawn mower comprises a traveling control module configured to control the traveling and steering of the mower, an image capturing module configured to capture the surrounding images of the mower, an operation module configured to provide a surrounding-determination information, and a storage module configured to store the surrounding-determination information. The operation module determines a grass area by analyzing the surrounding images captured by the image capturing module. The mower defines a grass area accurately without a predetermined boundary.

19 Claims, 6 Drawing Sheets

(51) Int. Cl.
*H04N 5/225* (2006.01)
*G06K 9/62* (2022.01)
*A01D 34/00* (2006.01)
*G05D 1/00* (2006.01)
*G06V 20/56* (2022.01)
*G06V 40/10* (2022.01)
*A01D 101/00* (2006.01)

(56) References Cited

U.S. PATENT DOCUMENTS

2018/0125003 A1* 5/2018 Wu .................... G06K 9/00664
2019/0230850 A1* 8/2019 Johnson ................ G05D 1/0088
2020/0042009 A1* 2/2020 Yang .................... A01D 34/008

FOREIGN PATENT DOCUMENTS

| CN | 107463166 A | 12/2017 | | |
| CN | 107633199 A | 1/2018 | | |
| EP | 3199009 A1 * | 8/2017 | ........... | G05D 1/0246 |
| WO | WO-2018123631 A1 * | 7/2018 | ........... | G05D 1/0088 |
| WO | WO-2018220528 A1 * | 12/2018 | ........... | G05D 1/0223 |

\* cited by examiner

SMART LAWN MOWER

BACKGROUND OF THE INVENTION

1. Field of the Invention

Embodiments disclosed herein relate to a smart lawn mower configured to determine a surrounding image relative to various environments.

2. Description of the Prior Art

Current smart lawnmower is capable to autonomously travel and cut grass on an area within a predetermined boundary, which leads to a limitation that the mower cannot determine a grass area autonomously if the user does not predetermine a boundary. In another respect, the smart lawn mower may determine a grass area based on default datasets. However, real-world environments with respect to such factors as various lighting environments and various types of grass change continuously. It is difficult for the smart lawn mower to determine the grass area accurately based on the default datasets. Therefore there is a continuous need for a new and improved smart lawn mower.

SUMMARY OF THE INVENTION

In one embodiment, a smart lawn mower comprises a traveling control module, an image capturing module, an operation module and may further comprise a storage module. The operation module provides a surrounding-determination information and determines a grass area by analyzing surrounding images based on the surrounding-determination information while the mower operates to cut grass autonomously. The traveling control module controls a driving motor to move the mower on the grass area.

In one embodiment, a smart lawn mower comprises a machine learning module, wherein the machine learning module adjusts the surrounding-determination information by adjusting at least one weight of at least one neural network node based on the surrounding images captured while the mower follows the user to travel on the grass area.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Figure 1:
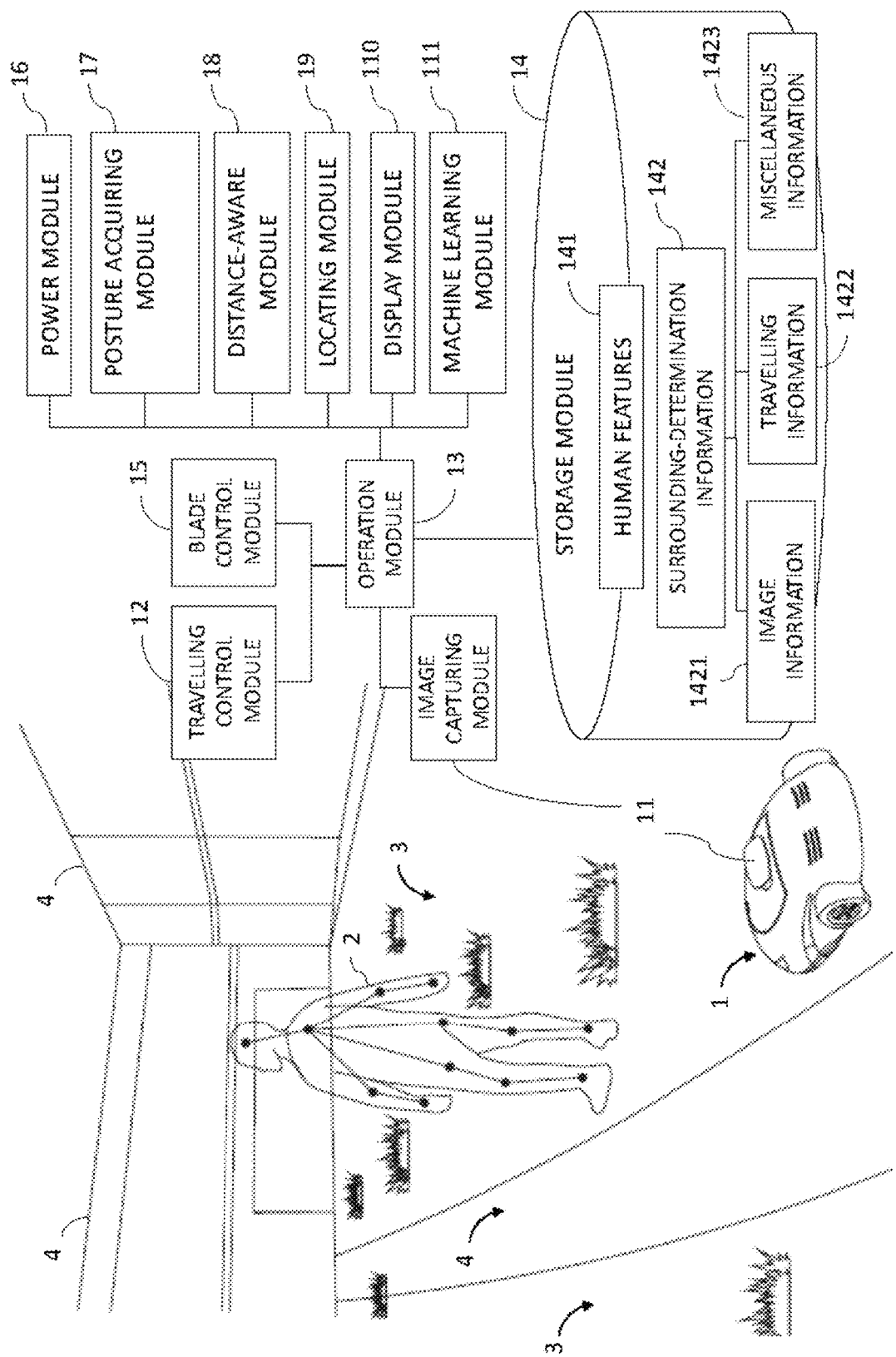
FIG. 1 indicates a smart lawn mower according to one embodiment.

FIG. 1 shows the smart lawn mower 1 including an image capturing module 11, a traveling control module 12, an operation module 13, a storage module 14, a blade control module 15, a power module 16, a posture acquiring module 17, a distance-aware module 18, a locating module 19, a display module 110 and a machine learning module 111. The traveling control module 12 includes a plurality of wheels coupled with a driving motor and is configured to control the traveling and steering of the mower. The image capturing module 11 is configured to capture the surrounding images of the mower. The operation module 13 is coupled with the image capturing module 11, the traveling control module 12 and the storage module 14. The operation module 13 provides a surrounding-determination information 142 based on the surrounding images captured by the image capturing module 11 and stores the surrounding-determination information 142 in the storage module 14. FIG. 1 further shows a user 2, a grass area 3 and non-grass area 4.

Figure 2:
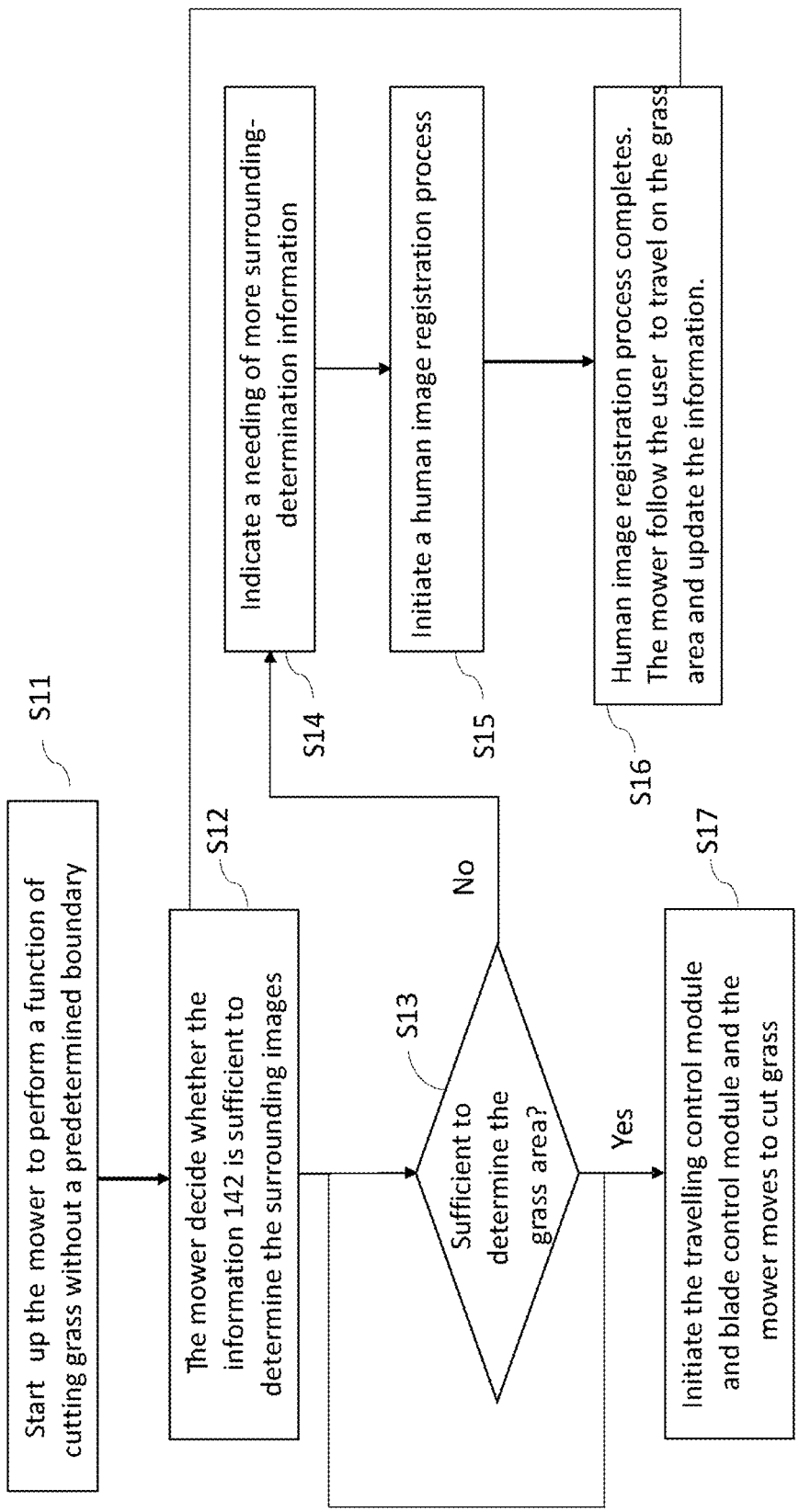
FIG. 2 is a flow chart illustrating the operation of the smart lawn mower according to one embodiment.

FIG. 2 is a flow chart illustrating the operation of the mower 1. At step S11, the user 2 starts up the mower 1 to perform a function of cutting grass without a predetermined boundary. At step S12, the mower 1 decides whether the surrounding-determination information 142 stored in the storage module 14 is sufficient to determine the surrounding images captured by the image capturing module 11. The surrounding-determination information 142 includes an image information 1421, a travelling information 1422 and miscellaneous information 1423. These information may be entirely or partially processed.

Figure 3:
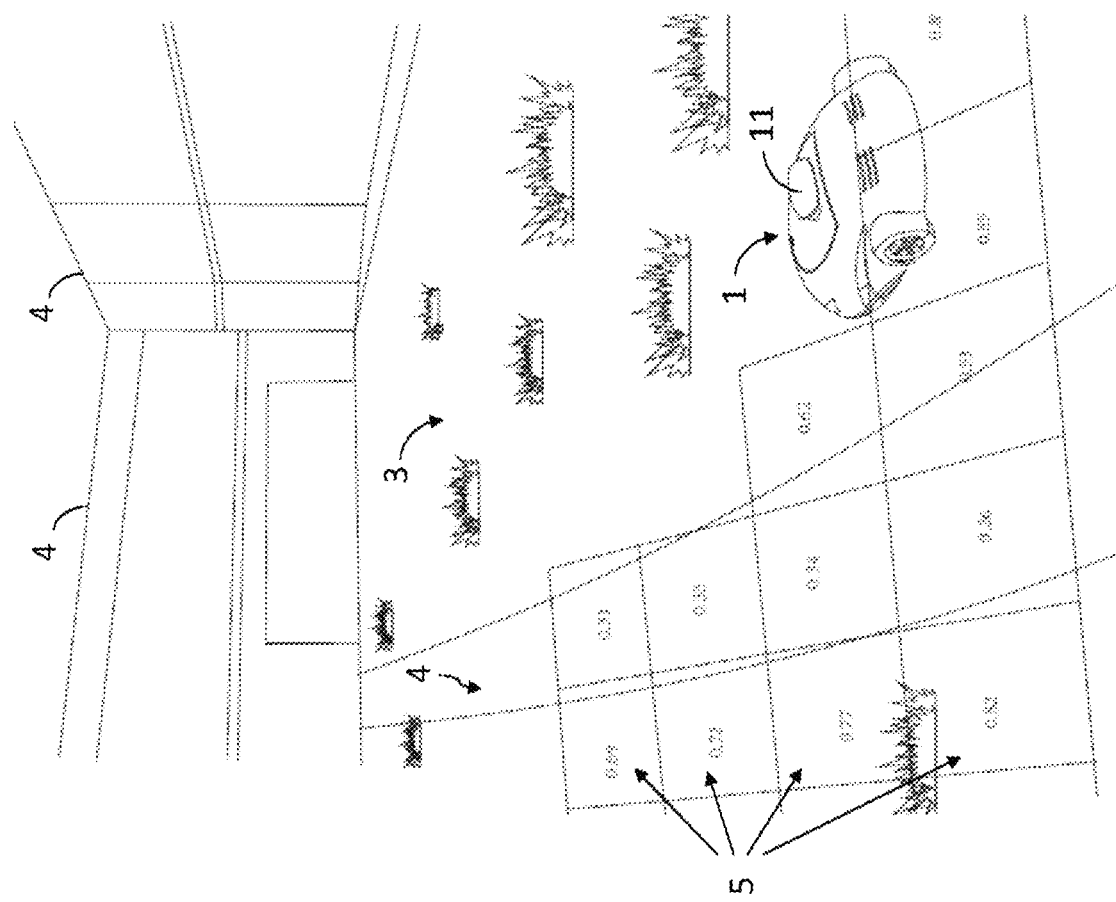
FIG. 3 is a schematic view illustrating the process of the smart lawn mower determining images according to one embodiment.

As illustrated in FIG. 3, the surrounding images captured will be broken down into one or more sub-pixels 5 for analyzing. The contents in sub-pixels 5, such as colors, lines, will be compared with the contents in the surrounding-determination information 142 to get one or more similarities. The similarities range from 0 ("Unlike") to 1 ("Like").

At step S13 in FIG. 2, if the current surrounding-determination information 142 is sufficient to determine the grass area 3, then go to step S17. If a proportion of desirable sub-pixels 5, where the similarities of these desirable sub-pixels exceed a predetermined similarity threshold, to all sub-pixels 5 is higher than a predetermined proportional threshold, then the surrounding-determination information 142 is sufficient to determine the grass area 3. For example, a predetermined similarity threshold is 0.6 and a predetermined proportional threshold is 70%. If the similarity of one sub-pixel 5 exceeds 0.6, then the sub-pixel 5 will be determined as grass. Otherwise, if the similarity of a sub-pixel 5 is below 0.6, then the sub-pixel 5 will be determined non-grass. If the proportion of the desirable sub-pixels 5 to all sub-pixels 5 is higher than 70%, then the surrounding-determination information 142 is determined as sufficient to determine the grass area 3.

If the surrounding-determination information 142 is insufficient to determine the grass area 3, then go to step S14. At step S14, the display module 110 will indicate a needing of more surrounding-determination information 142. At step S15, the user 2 presses a button (not shown in the figures) configured to initiate a human image registration process. When the user 2 appears in the range of view of the mower 1, the mower 1 continues the human image registration process. The image capturing module 11 obtains human features 141 of the user 2 as a registered user's human features and stores the human features 141 in the storage module 14. The human features 141 include but not limited to body detection information and cloths colors.

At step S16, the human image registration process is completed. The mower 1 will follow the user 2 to travel on the grass area 3 if the image capturing module 11 identifies the user 2 as a registered user after matching up the human features 141. The surrounding-determination information 142 is adjusted by integrating the image information 1421 obtained by the image capturing module 11, the travelling information 1422 obtained by the posture acquiring module 17 and miscellaneous information 1423 obtained by the distance-aware module 18 and the locating module 19. Specifically, the image information 1421 includes but not limited to grass color information, wherein the grass color information preferably includes grass colors relative to various lighting environments and various types of grass. The posture acquiring module 17 includes but not limited to any combination or number of inertial measurement unit (IMU), gyroscope, speed sensor or accelerometer. The travelling information 1422 includes but not limited to three-axis attitude angle of the mower during traveling and/or a surface friction calculated based on one or more speed value obtained by the speed sensor while the mower is travelling. The distance-aware module 18 includes but not limited to any combination or number of ultrasonic distance device, infrared distance device and/or laser detection and measurement device. The locating module 19 includes but not limited to any combination or number of GPS, WIFI wireless location device (indoor) or Bluetooth beacons wireless location device (indoor). Miscellaneous information 1423 includes but not limited to location, time and obstacle.

While the foregoing is directed to embodiments of the mower using the image capturing module to register, identify and follow the user, the embodiments may be used with other types of sensors such as distance sensor to register, identify and follow the user.

While the foregoing is directed to embodiments of the mower using the human features to follow a user to travel on the grass area, the embodiments may be used with other types of remote control device to control the mower to traveling on the grass area.

At step S16, having obtained the image information, the travelling information and miscellaneous information under current environment, the mower 1 determines the grass area accurately based on the real-world grass colors and/or the surface friction. In one embodiment, the operation module 13 adjusts the surrounding-determination information 142 based on the grass colors information obtained at a closest time. Then the process returns to step S12 and S13. The mower 1 decides whether the surrounding-determination information 142 is sufficient to determine the grass area 3. If sufficient, go to step S17.

At step S17, the mower 1 initiates the traveling control module 12 and the blade control module 15. The traveling control module 12 controls the driving motor to move the mower 1 on the grass area 3 and the blade control module 15 controls the mower 1 to cut grass.

Figure 4B:
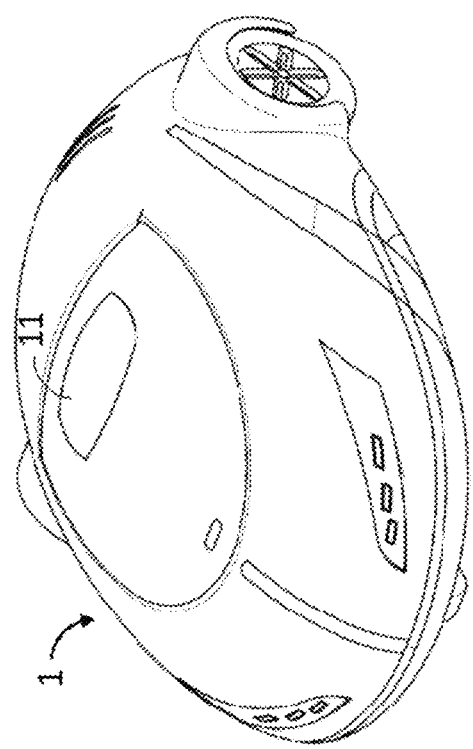
FIG. 4B shows the image capturing module retracted inside the body of the smart lawn mower according to one embodiment.
Figure 4A:
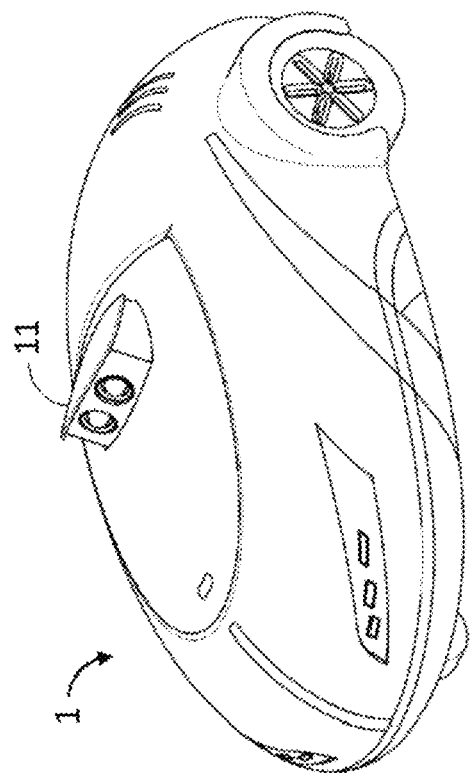
FIG. 4A shows the image capturing module lifted up outside the body of the smart lawn mower according to one embodiment.

As shown in FIG. 4A, the image capturing module 11 is lifted up while the mower 1 performs a function of cutting grass without a predetermined boundary. Camera on the image capturing module 11 may be a monocular camera, a binocular camera, a fish-eye camera or a stereo camera. As shown in FIG. 4B, the image capturing module 11 comprises a lifting cover that is configured to lift up the image capturing module 11 outside the body of the mower 1 and retract the image capturing module 11 inside the body. The image capturing module 11 will be retracted inside the body to keep the camera lens clean while the mower 1 does not perform the function of cutting grass without the predetermined boundary. The mower 1 may be closed, standby or in other status. The image capturing module 11 is capable to be retracted by manual or when the mower is autonomously navigated with GPS.

Figure 5:
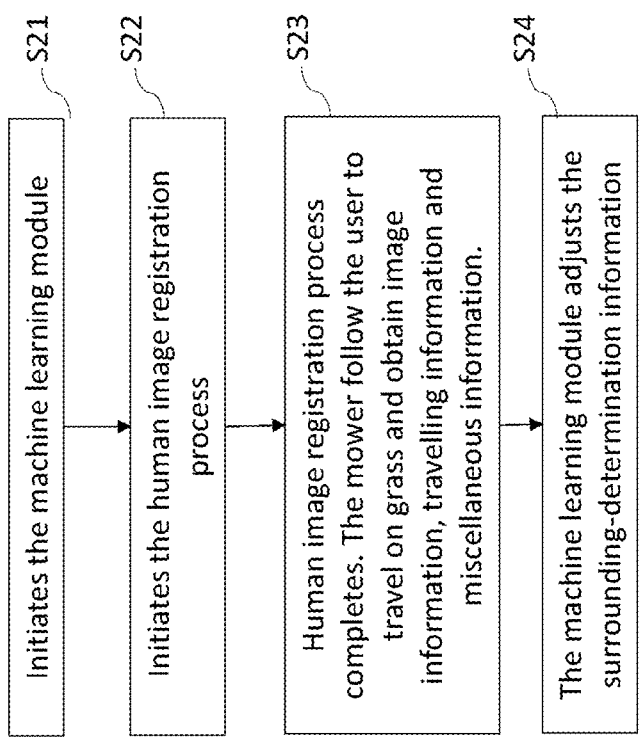
FIG. 5 is a flow chart illustrating a method of machine learning of the smart lawn mower according to one embodiment.
Figure 6:
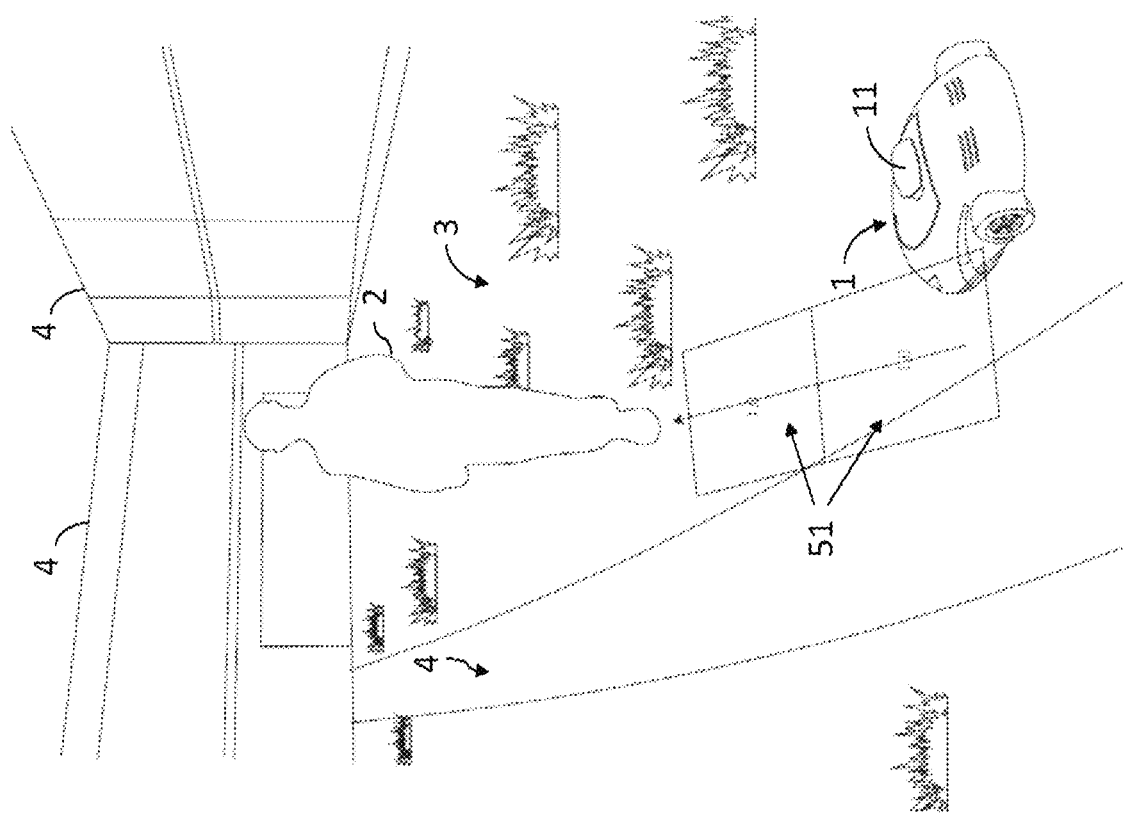
FIG. 6 is a schematic view showing the smart lawn mower using the method of machine learning according to one embodiment.

FIG. 5 is a flow chart of a method of machine learning. FIG. 6 is a schematic view of the mower using the method of machine learning. At step S21, the mower 1 initiates the machine learning module 111. The machine learning module 111 is initiated at a predetermined time, by an activity or by manual direction.

At step S22, the mower 1 initiates the human image registration process. The image capturing module 11 obtains the human features 141 of the user 2 and stores the human features 141 in the storage module 14. The human features 141 include but not limited to body detection information, shape information and cloths colors information.

At step S23, the human image registration process is completed. The mower 1 will follow the user 2 based on the human features 141 to travel on the grass area 3. The mower 1 will use the image capturing module 11 to obtain the image information 1421, use the posture acquiring module 17 to obtain the travelling information 1422 and use the distance-aware module 18 and the locating module 19 to obtain miscellaneous information 1423.

At step S24, the machine learning module 111 adjusts the surrounding-determination information 142 by adjusting at least one weight of at least one neural network node using the obtained image information 1421, the obtained travelling information 1422 and obtained miscellaneous information 1423. As shown in FIG. 6, the mower 1 adjusts at least one weight of at least one neural network node while the mower 1 follows the user to travel on the grass area. The image of grass area that the user has traveled on will be broken down into sub pixels 51 which will become materials for self learning and training of neural network.

Embodiments of the disclosure include a smart lawn mower to determine a grass area accurately and cut grass without predetermining a boundary based on the image information of the grass area under current environment captured by an image capturing module. The machine learning module strengthens outcomes of determining.

Although the present disclosure has been described with an exemplary embodiment, various changes and modifications may be suggested to one skilled in the art. It is intended that the present disclosure encompass such changes and modifications as fall within the scope of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A smart lawn mower, comprising:
 a traveling control module, configured to control the traveling and steering of the mower, wherein the traveling control module includes a plurality of wheels coupled with a driving motor;
an image capturing module, configured to capture the surrounding images of the mower;
a storage module;
an operation module, configured to provide a surrounding-determination information based on the surrounding images captured by the image capturing module and store the surrounding-determination information in the storage module; and
a speed sensor, wherein the operation module calculates a surface friction based on one or more speed value obtained by the speed sensor and integrates the surface friction into the surrounding-determination information;
wherein the operation module determines a grass area by analyzing the surrounding images based on the surrounding-determination information while the mower operates to cut grass autonomously;
wherein the traveling control module controls the driving motor to move the mower on the grass area.

2. The lawn mower of claim 1, wherein the surrounding-determination information includes grass colors information.

3. The lawn mower of claim 2, wherein the grass colors information includes grass colors relative to various lighting environments.

4. The lawn mower of claim 2, wherein the grass colors information includes grass colors relative to various types of grass.

5. The lawn mower of claim 1, further comprising a lifting cover coupled to the image capturing module and configured to lift up the image capturing module outside the body of the mower and retract the image capturing module inside the body.

6. The lawn mower of claim 1, further comprising a remote control device, wherein the device controls the mower to travel on the grass area when the surrounding-determination information is insufficient to determine the grass area, and the operation module adjusts the surrounding-determination information based on the surrounding images captured by the image capturing module.

7. A smart lawn mower, comprising:
a traveling control module, configured to control the traveling and steering of the mower, wherein the traveling control module includes a plurality of wheels coupled with a driving motor;
an image capturing module, configured to capture the surrounding images of the mower;
a storage module; and
an operation module, configured to provide a surrounding-determination information based on the surrounding images captured by the image capturing module and store the surrounding-determination information in the storage module;
wherein the operation module determines a grass area by analyzing the surrounding images based on the surrounding-determination information while the mower operates to cut grass autonomously,
wherein the traveling control module controls the driving motor to move the mower on the grass area when the surrounding-determination information is sufficient to determine the grass area;
wherein the mower enters a user following mode to follow a user to travel on the grass area when the surrounding-determination information is insufficient to determine the grass area; and
wherein the operation module adjusts the surrounding-determination information based on the surrounding images captured by the image capturing module while the mower follows the user to travel on the grass area.

8. The lawn mower of claim 7, further comprising a machine learning module, wherein the machine learning module adjusts the surrounding-determination information by adjusting at least one weight of at least one neural network node based on the surrounding images captured while the mower follows the user to travel on the grass area.

9. The lawn mower of claim 7, wherein the user following mode includes a human image registration process before following the user to travel.

10. The lawn mower of claim 9, wherein the human image registration process comprising:
obtaining the human features of the user by the image capturing module, wherein the human features include shape information and cloths colors information;
storing the human features in the storage module.

11. The lawn mower of claim 7, wherein the operation module uses surface friction to help determine the grass area.

12. The lawn mower of claim 7, wherein the operation module adjusts the surrounding-determination information based on grass colors information obtained at a closest time.

13. A smart lawn mower, comprising:
a traveling control module, configured to control the traveling and steering of the mower, wherein the traveling control module includes a plurality of wheels coupled with a driving motor;
an image capturing module, configured to capture the surrounding images of the mower;
a storage module;
an operation module, configured to provide a surrounding-determination information based on the surrounding images captured by the image capturing module and store the surrounding-determination information in the storage module; and
a sensor, wherein the sensor instructs the mower to follow a user to travel on a grass area when the surrounding-determination information is insufficient to determine the grass area, and the operation module adjusts the surrounding-determination information based on the surrounding images captured by the image capturing module;
wherein the operation module determines the grass area by analyzing the surrounding images based on the surrounding-determination information while the mower operates to cut grass autonomously;
wherein the traveling control module controls the driving motor to move the mower on the grass area.

14. The lawn mower of claim 13, wherein the surrounding-determination information includes grass colors information.

15. The lawn mower of claim 14, wherein the grass colors information includes grass colors relative to various lighting environments.

16. The lawn mower of claim 14, wherein the grass colors information includes grass colors relative to various types of grass.

17. The lawn mower of claim 13, further comprising a lifting cover coupled to the image capturing module and configured to lift up the image capturing module outside the body of the mower and retract the image capturing module inside the body.

18. The lawn mower of claim 13, further comprising a remote control device, wherein the device controls the mower to travel on the grass area when the surrounding-determination information is insufficient to determine the grass area, and the operation module adjusts the surrounding-determination information based on the surrounding images captured by the image capturing module.

19. The lawn mower of claim 13, further comprising a machine learning module, wherein the machine learning module adjusts the surrounding-determination information by adjusting at least one weight of at least one neural network node based on the surrounding images captured while the mower follows the user to travel on the grass area.

* * * * *